Feb. 4, 1936.  J. J. TATUM  2,029,644
CAR SPRING MOUNTING
Filed June 3, 1932  3 Sheets-Sheet 1
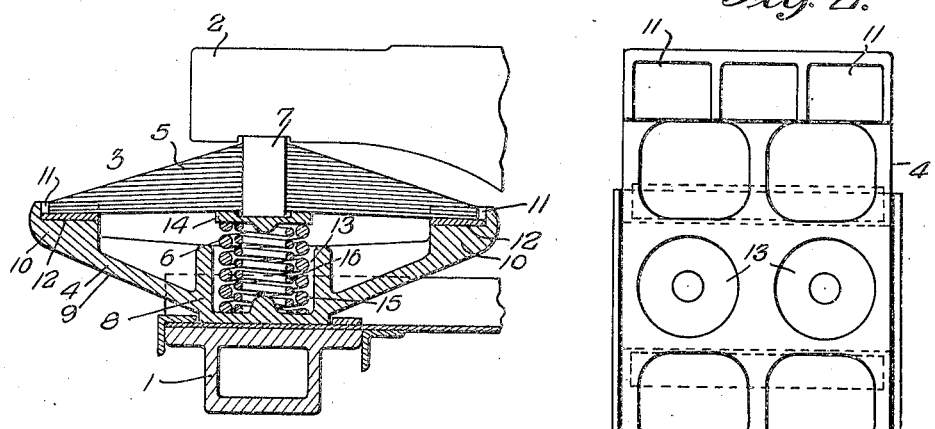
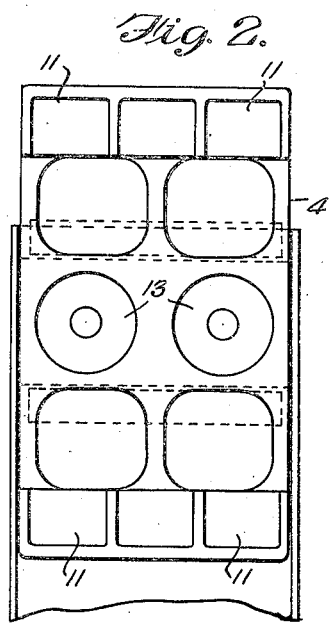
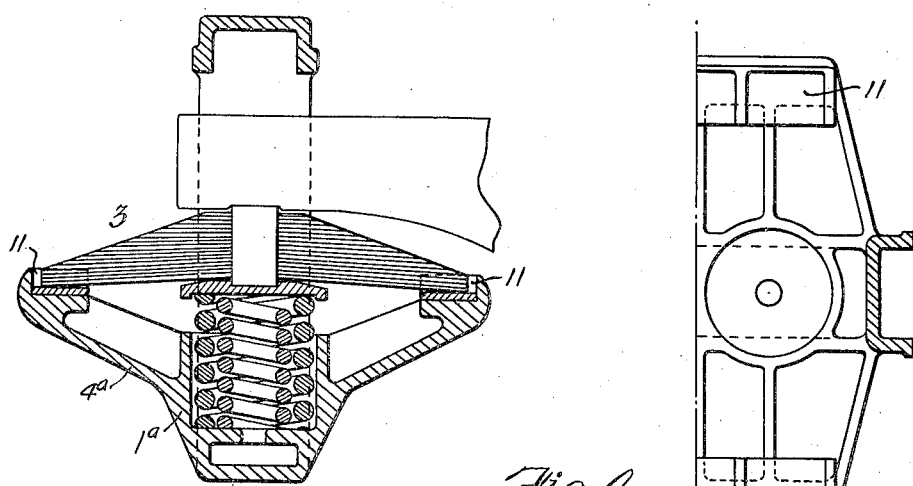
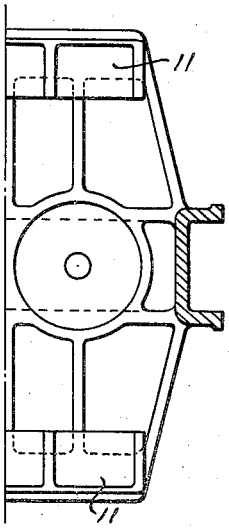
Inventor
John J. Tatum Feb. 4, 1936. J. J. TATUM 2,029,644
CAR SPRING MOUNTING
Filed June 3, 1932 3 Sheets-Sheet 2

Inventor
John J. Tatum
By
Attorney

Feb. 4, 1936.        J. J. TATUM        2,029,644
CAR SPRING MOUNTING
Filed June 3, 1932        3 Sheets-Sheet 3

Inventor
John J. Tatum
By
Attorney

Patented Feb. 4, 1936

2,029,644

UNITED STATES PATENT OFFICE 2,029,644

CAR SPRING MOUNTING

John J. Tatum, Baltimore, Md.

Application June 3, 1932, Serial No. 615,184

17 Claims. (Cl. 267—3)

This invention relates to car bolster, locomotive driving wheel or trailer springs for railway cars and other like vehicles and particularly to springs having shock-absorbing as well as cushioning properties, for the purpose of preventing violent vertical movements of the spring and rolling of the vehicle under different load conditions of the vehicle, i. e., when the vehicle is empty, or fully loaded, or loaded to different degrees.

Various combinations of springs and shock absorbers have heretofore been used with the object of securing soft cushioning for the car and its lading, while preventing violent vertical and rolling motions of the vehicle while in transit, which motions are liable not only to damage the vehicle and its lading but to lift the wheels from the track, with the liability of causing great damage to the car and its lading or other serious consequences to the car and other cars of a train of which it forms a part, as well as to the trackway.

None of these prior combinations have, to my knowledge, however, been entirely successful in providing a simple and comparatively inexpensive type of shock-absorbing and cushioning spring which automatically adjusts itself to various conditions of load and compensatingly regulates its shock-absorbing and cushioning actions, which is essential in order to secure a soft cushioning action.

The main object of my invention is to provide a shock-absorbing and cushioning spring which overcomes the objections to prior spring devices, and which, while simple and comparatively inexpensive in construction, automatically adjusts itself to load conditions to give a soft cushioning action.

A further object of my invention is to provide a composite construction of truck spring, employing in combination one or more semi-elliptical springs and one or more coacting coiled spring units, whereby a soft cushioning action for the car and its lading will be secured while at the same time all violent vertical action of the spring and rolling motion of the vehicle will be prevented.

A still further object of the invention is to provide a truck spring construction having cushioning and shock absorbing or damping actions of such character as to give proper cushioning support to the vehicle and its lading, while preventing vertical oscillations and rolling, at any and all degrees of load of the vehicle.

A still further object of the invention is to provide a variable diffusion, non-harmonic, anti-shimmying spring for varying loads and varying speeds, and which may be used upon vehicle trucks of conventional construction.

With these and other objects in view, the invention consists of the features of construction, combination and arrangement of parts, hereinafter fully described and claimed, reference being had to the accompanying drawings, in which:—

Fig. 1 is a vertical transverse section through a truck side frame and truck bolster spring embodying one form of my invention.

Fig. 2 is a top plan view of the spring bearer or bed frame disclosed in Fig. 1, showing in dotted lines the semi-elliptical spring members associated therewith.

Fig. 3 is a view similar to Fig. 1 showing the use of a modified type of spring bearer or bed frame which is cast integral with the truck side frame.

Fig. 4 is a plan view similar to Fig. 2 of the same.

Figure 5:
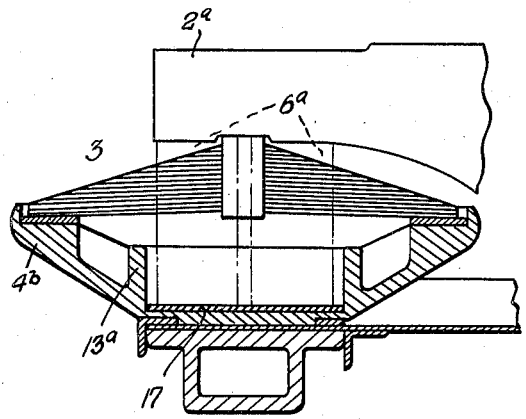
Figs. 5 and 6 are views similar to Figs. 1 and 2 of another modified form of the invention.

Referring now more particularly to the drawings, in which I show the application of my invention to a truck side frame and bolster of a railway truck, I designates a truck side frame, 2 a truck bolster or carrying beam, and 3 my improved spring construction interposed between the lower portion of the truck side frame and the adjacent end of the bolster, which is movable vertically in its guideway in the truck side frame in the usual manner.

My improved spring construction 3 comprises relatively movable bottom and top members 4 and 5 and an associated helical or other coiled spring unit 6 disposed between the same.

The member 4, as shown in the present instance, is of rigid construction and comprises a casting which forms a bearer, backing or bed frame for the member 5 on which the latter rests, the member 5 consisting of a semi-elliptic spring composed of any suitable number of leaves united by a center clip 7. The bearer or frame 4 is of substantially the same formation in end elevation or longitudinal center as the spring member 5, and consists of a body or center part 8 and similar arms 9 extending upwardly at a divergent angle therefrom. The ends of the arms 9 terminate in supporting seats 10 each formed in its upper surface with a retaining groove, recess or pocket 11, such grooves, recesses or pockets 11 receiving the ends of the semi-elliptic spring 5. The ends of the spring 5 are thus loosely mounted to have both vertical pivotal motion and longitudinal play or sliding motion in the pockets 11 as the spring 5 contracts and elongates in its cushioning actions. Hard metal wear plates 12 may be welded or otherwise secured in the bottoms of the pockets 11, in order to provide durable wear surfaces against which the ends of the spring 5 seat and have movement, but, in place of these wear plates, the bearing faces of the pockets may be case hardened or cushioning inserts or blocks of high capacity rubber may be substituted for the metal wear plates.

The center part 8 of the bearer 4 is formed with a center pocket or socket 13 terminating below the pockets 11 and receiving the coiled spring unit 6, which unit seats at its base on the bottom of the pocket and bears at its top against a spring cap 14 disposed upon the underside of the center part of the spring 5 and which may be secured thereto by the clip 7. The units 6 may consist of a single spring or a plurality of concentric springs, and as shown herein comprises an outer coiled spring 15 and an inner coiled spring 16 of suitable relative strengths and frequencies to form a spring assembly having the desired supporting or cushioning actions for the bolster structure for which it is designed.

The ordinary elliptic bolster spring in common use is formed of two superposed semi-elliptic springs. In my improved spring structure the spring member 5 takes the place of one of the usual semi-elliptic springs, and the metal bearer, backing or support 4 takes the place of the other semi-elliptic spring, thus permitting of the use and association with the spring member 5 of a coiled spring unit 6 having a higher degree of cushioning action than the omitted semi-elliptic spring and which is combined and arranged in conjunction with the retained semi-elliptic spring member 5 in such manner that the latter not only serves its usual function but acts as a dampener to control the movements of the spring 6. Thus while a spring structure of greater cushioning action than an ordinary elliptic spring is produced, which is capable of yieldingly sustaining and cushioning varying loads, the usual violent reactions of the coiled spring are dampened and controlled by the semi-elliptic spring 5, so that an effective shock-absorbing soft and easy cushioning action is secured in place of the violent actions ordinarily resulting from the use of a coiled cushioning spring. The composite spring combination thus provided also produces a spring of variable diffusion, non-harmonic, anti-shimmying type, which has a range of cushioning and shock-absorbing actions suitable for varying loads and varying speeds, whereby substantial advantages over all prior types of bolster springs are obtained. The capacity of the spring may be varied to suit varying conditions, and to widely varying degrees, by employing a single semi-elliptic spring in conjunction with a single coiled spring unit, a single semi-elliptic spring in conjunction with a plurality of coiled spring units or a plurality of semi-elliptic springs in conjunction with a plurality of coiled spring units, suitably arranged with relation to each other.

In Figs. 1 and 2 I have shown a spring construction in which the bearer 4 is provided with three parallel pairs or sets of spring pockets 11 and a pair of transversely alined spring pockets 13, for the use in connection therewith of three parallel semi-elliptic springs 5 and a pair of coiled units 6, the end of the bolster 2 thus being resiliently supported by a combination of three springs 5, on which it rests, and a pair of underlying coiled spring sets 6, as will be readily understood, but the number of springs and their relative arrangement, as hereinafter described, may be varied to suit varying conditions.

In the modification of the invention shown in Figs. 3 and 4 of the drawings I have shown a spring structure which is in all respects similar to that shown in Figs. 1 and 2 except that the bearer or backing member 4a is cast integrally with the lower portion of the truck frame side plate, as indicated at 1a, which construction may be employed as desired and under certain conditions.

Figure 6:
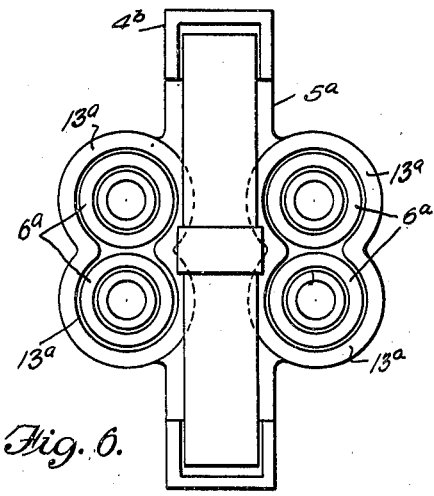

In the modification of the invention shown in Figs. 5 and 6 the bearer or backing member 4b is provided with a single pair of pockets 11 for reception of the ends of a single centrally disposed semi-elliptic spring member 5a, and said bearer or backing member is formed at opposite sides with pairs of pockets 13a arranged in longitudinal and transverse alinement and receiving a corresponding number of coiled spring units 6a of the character previously described. The end of the bolster 2a rests, in this spring structure, on the central part of the elliptic spring and on the upper ends of the pairs of coiled springs 6a and is thus yieldingly supported. While in this arrangement the coiled springs are not in contact with the semi-elliptic spring so as to oppose its depression, it will be seen that the semi-elliptic spring limits the range of downward movement of the bolster or upward movement of the side frame relative thereto, and consequently the degree of contraction of the coiled springs under pressure, whereby a damping action is instituted to reduce the range of vertical motion of the coiled springs and to prevent any unduly violent motion thereof, while at the same time giving a soft cushioning action between the bolster and side frame.

Figure 7:
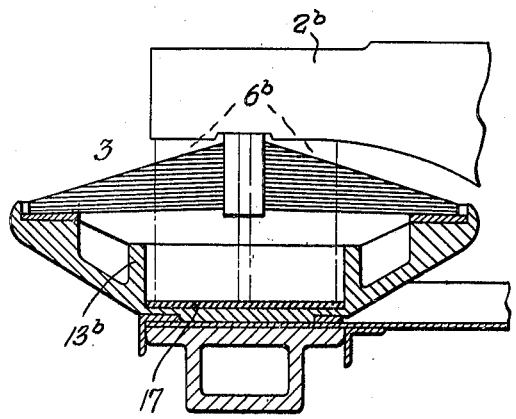
Figs. 7 and 8 are views similar to Figs. 1 and 2 of still another modified form of the invention.
Figure 8:
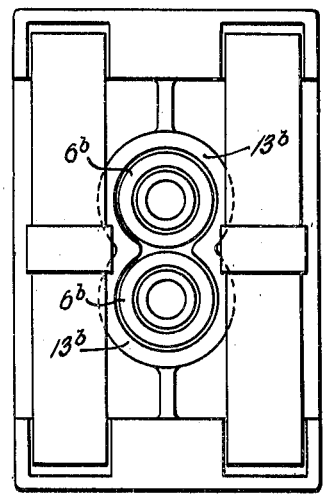

In the modified form of the invention shown in Figs. 7 and 8 the bearer or backing member 4c is provided with two pairs of parallel spring pockets 11 for a corresponding number of semi-elliptic springs, which pairs of pockets 11 are arranged at opposite sides of the bearer or backing member and on opposite sides of two longitudinally alined and centrally disposed pockets 13b containing a pair of coiled spring units 6a, the arrangement being such that the end of the bolster rests upon all four springs. The cushioning and damping actions here are substantially the same as those set forth with respect to the construction shown in Figs. 5 and 6.

In Figs. 5 and 7 the spring pockets 13a and 13b are shown as provided at their bottoms with cushioning and sound deadening disks 17 made of rubber or similar sound deadening material, to reduce the transmission of noise between the parts at these points.

Figure 9:
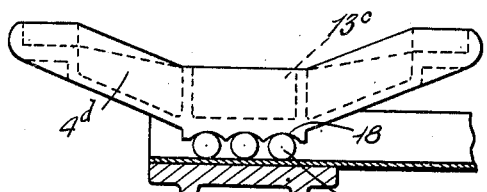
Fig. 9 is a view similar to Fig. 1 of still another modification in which the spring bearer or bed frame is adapted to serve also as a spring roller cap or seat for a lateral motion truck.
Figure 10:
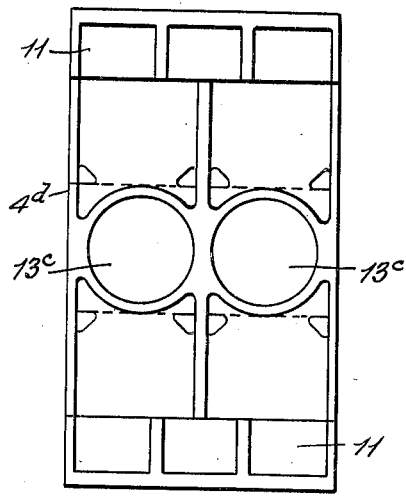
Fig. 10 is a top plan view of the same.

In the modified form of the invention shown in Figs. 9 and 10 the bearer or backing member 4d is provided with pockets 11 in number and arrangement similar to the showing in Figs. 1 and 2 for the reception of three semi-elliptic springs 5 arranged in parallel relationship, and said bearer or backing member is provided centrally of its length with a pair of transversely alined sockets 13c to receive a pair of correspondingly arranged coiled springs 6c, the arrangement thus being such that the bolster rests upon the group of parallel semi-elliptic springs which rest intermediately upon the pairs of coiled springs 6c, whereby a cushioning or shock-absorbing and damping action of effective character will be obtained. In this construction also the bottom surface of the central part of the bearer or backing member 4d and the bottom part of the truck side frame are provided with grooves 18 for the reception of anti-friction bearing balls or rollers 19 adapting the bearer or backing member to be used in connection with a lateral motion truck and to serve as a combined spring bearer and spring roller cap or seat in such a structure.

Figure 11:
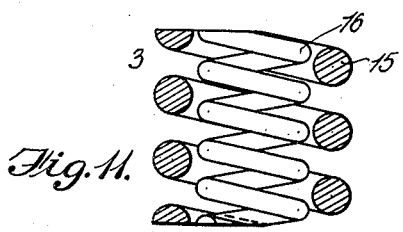
Fig. 11 is a view showing a coiled spring unit removed from its bearer.

In Fig. 11 I have shown one of the spring units 6 removed from its pocket. The spring members of this spring unit may be of any suitable height and diameter, of capacity to sustain load weights and strains within specified limits, and such quality as to be proof against deterioration or breakage for a period of several years. Each spring member will be stamped or cut at both ends on a proper bevel or taper for proper seating action.

Figure 12:
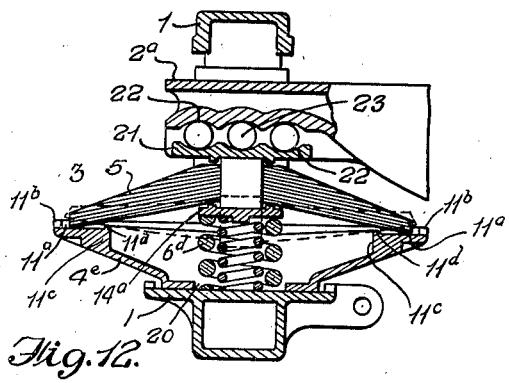
Figs. 12 and 13 are views similar to Figs. 1 and 2 of still another modified form of the invention.
Figure 13:
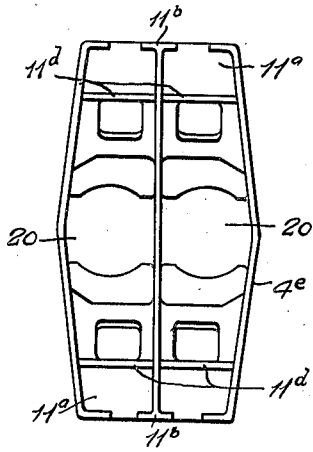
Figure 14:
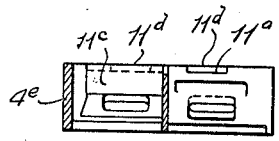
Fig. 14 is a view partly in end elevation and partly in cross section through the bearer shown in Figs. 12 and 13.

In Figs. 12, 13, and 14 I have shown another construction of bolster support permitting lateral motion of the bolster and truck. In this construction the bearer or backing member 4e has its bottom part properly formed to seat upon the bottom part of the bolster guideway of the truck side frame 1 and formed with openings 20 through which the lower end of the spring units 6d project to seat upon the bottom of the bolster guideway. Each coil spring seats at its upper end against the cap 14a on the underside of the coacting semi-elliptic spring member 5 on which is mounted a roller cap or bearing plate 21 disposed beneath the end of the bolster 2a. The bolster and plate 21 have their opposed surfaces provided with grooves 22 receiving the anti-friction rollers or balls 23 adapting the truck and bolster to have free relative lateral movement. In this form of my invention I have also shown the bearer or backing member 4e provided with outer bearing seats or surfaces 11a, corresponding to surfaces 11 previously mentioned, said outer bearing members having stops 11b, and inner bearing members 11c having upstanding ledges or fulcrum portions 11d, on which bearing portions the ends of the semi-elliptic spring 5 are adapted to rock and slide. With this construction, when the spring 5 is carrying its initial load, which may be the minimum or light weight of the car, the ends of the spring rock and slide on the seat surfaces or outer bearings 11a. As the car is loaded, or additional weight placed upon the semi-elliptic spring, such spring gradually flattens out and engages the inside bearing, as shown in dotted lines in Fig. 12, whereby the bearing points between the ends of the spring are shortened, thus providing a spring of compensating character whose strength is automatically governed and regulated by the load weight. This will be evident from the fact that by providing outside and inside bearings for the spring ends, the effect of a long spring action is obtained for light loads, and the effect of a shortened or short spring action of sturdier type obtained for heavier loads, ensuring easier riding under light loads and a sturdier and greater carrying capacity spring for heavier loads. This construction, in other words, provides a spring whose bearing points shift under light and heavy load weights to provide an empty and load spring, or variant capacity spring, without change of construction of the spring itself.

It will be seen that in each of the embodiments of my invention herein disclosed a spring structure comprising a semi-elliptic spring and a backing therefor are employed in association with a helical or coiled spring to yieldingly support the truck bolster in such manner as to safely cushion the motion of the bolster and to properly dampen and control the motions of the coiled spring to prevent too violent vertical movements thereof. By this means the car body will be supported for easy cushioning movements and all violent vertical motions due to rebounding motions of the coiled springs will be dampened and controlled and prevented from being transmitted to the body. Hence liability of damage to the body or its lading, or liability of the lifting of truck wheels off the tracks, with its serious possibilities, will be obviated, while at the same time a better elastic suspension of the body will be obtained than is possible by the use of elliptical springs of ordinary type. By eliminating objectionable vertical movements of the bolsters and body rolling of the body will also be prevented, as will be readily understood.

While I have shown and described the spring bearer or backing member arranged as the bottom member of the spring structure, it is to be understood that the arrangement of the bearer or backing member and semi-elliptic spring may under some conditions be reversed, so that the semi-elliptic spring will form the bottom member while the backing will form the top member. I therefore do not limit the arrangement of these parts in such respect to those arrangements shown.

The drawings show some of many and various arrangements of the different types of springs which may be used in combination for the purposes of varying and regulating the cushioning and damping actions to suit different types and sizes of vehicles and to secure an effective cushioning action, which is automatically controlled, with a wide variation of load weights and at different traveling speeds. It is to be understood, however, that I do not limit my invention to these particular disclosures or any of them, as others suited for use under varied conditions may be employed whenever desired or required. I may, therefore, vary the construction and arrangement of parts to wide degrees within the scope of my invention as set forth in the appended claims, without departing from the spirit or sacrificing any of the advantages of the invention.

In Fig. 6 a single semi-elliptical spring 6c is shown, while in Fig. 8 two parallel elliptical springs 6d are shown.

What I claim is:—

1. A spring structure comprising a backing member having end pockets and a plurality of pairs of intermediate pockets, said intermediate pockets being arranged in transverse alinement, a semi-elliptic spring having its ends engaging the end pockets, and coiled springs engaging the intermediate pockets and arranged for cooperation with the semi-elliptic spring to yieldingly support a load resting thereon.

2. A vehicle spring structure comprising a rigid spring mount having a depressed central body portion and upstanding side portions, said body portion and upstanding side portions being provided with spring seats, a semi-elliptic spring having its concaved side facing downward and provided with friction generating end portions in direct slidable and pivotal engagement with the spring seats of the upstanding side portions of the mount, and a coil spring engaging the spring seat of the depressed body portion of the mount and backing the semi-elliptic spring between its friction generating end portions so as to yieldingly oppose extending movements of said semi-elliptic spring.

3. A vehicle spring structure comprising a rigid spring mount having a depressed central portion provided with a spring seat and having upwardly projecting side portions terminating in spring seats provided with substantially flat friction generating faces arranged in the same horizontal plane, a semi-elliptic spring having its concaved side facing downwardly and provided with friction generating end portions in direct slidable and pivotal engagement with said friction generating surfaces of the upstanding side portions of the mount, and a coil spring engaging the spring seat of the central body portion of the mount and bearing on the semi-elliptic spring so as to yieldingly back the same and oppose extending movements of said spring.

4. In a supporting and cushioning spring structure, the combination of a support having a central body portion provided with a pocket and arms extending in opposite directions from said body portion and provided with pockets, the floors of the pockets in the arms being arranged above the level of the floor of the pocket in the central body portion and forming friction surfaces, an inverted semi-elliptical spring having free end portions loosely mounted in the pockets in the arms and resting on and in direct pivotal and sliding engagement with the friction floor surfaces thereof, and a coiled spring engaging the pocket in the central body portion beneath the central portion of the semi-elliptical spring and extending upwardly therefrom and yieldingly supporting the central portion of the elliptical spring in balanced relation to the points of support of the ends of said semi-elliptical spring on said friction floor surfaces.

5. In a supporting spring structure, the combination of a rigid support comprising a central body portion having a pocket and outwardly and upwardly inclined arms provided at their ends with pockets, said pockets in the arms having their floors arranged equidistantly on opposite sides of and in the same horizontal plane above the level of the floor of the pocket in the body portion and forming friction surfaces, an inverted semi-elliptical spring arranged above said support bridging between said arms and having free end portions loosely fitted in and resting on and in direct pivotal and sliding engagement with the floors of the pockets in the arms, and a coiled spring seated upon the floor of the pocket in the body portion beneath the central portion of the semi-elliptical spring and extending upwardly therefrom and engaging and yieldingly supporting the central portion of the semi-elliptical spring in balanced relation to the points of support of the ends of said semi-elliptical spring on said friction surfaces.

6. In a supporting spring structure, the combination of a support having a body portion and end portions respectively provided with a central pocket and end pockets, the end pockets being arranged on opposite sides of the vertical plane of the central pocket and at a higher level and substantially in horizontal alinement with each other, each end pocket having an outer friction bearing surface and an inner friction bearing surface extending above the level of the outer bearing surface, an inverted semi-elliptical spring having its end portions loosely engaging the end pockets and resting on and in direct pivotal and sliding engagement with the outer friction bearing surfaces thereof when the spring is contracted and supporting light loads and adapted to slidably and pivotally engage the inner friction bearing surfaces of said pockets when the spring is extended and under compression of heavier loads, and a coiled spring seated upon the floor of the central pocket and extending upwardly therefrom and yieldingly supporting the central portion of the semi-elliptical spring.

7. In a spring supporting structure, the combination of a support having a central supporting surface and horizontally spaced supporting members arranged substantially at the same level and above the level of the central supporting surface and provided with spring pockets, the floors of said pockets being plane faced and forming friction surfaces, an inverted semi-elliptical supporting spring having its end portions loosely fitted in said pockets and in direct pivotal and slidable engagement at their end edges with the friction floor surfaces thereof, and spring means disposed beneath the central portion of the semi-elliptical spring and resting on the central supporting surface of the support and extending upwardly therefrom and engaging the central portion of the semi-elliptical spring to yieldingly support the same in balanced relation to the points of support of the end of the semi-elliptical spring on said friction surfaces.

8. In a spring supporting structure, the combination of a support having horizontally spaced supporting members provided with pockets arranged substantially at the same level, said pockets having plane floor portions providing outer friction surfaces and elevated portions at the inner ends of said friction floor surfaces, and an inverted semi-elliptical spring having its end portions loosely fitted in the pockets and slidably and pivotally engaging the outer friction floor surface thereof under light loads and adapted to rest upon and slidably and pivotally engage the elevated inner supporting portions of the pockets when the spring is extended and compressed under heavier loads.

9. In a supporting spring structure, the combination of a support having a body portion provided with a central pocket and arms extending upwardly therefrom and provided at the ends thereof with pockets, the floors of said end pockets being arranged above the level of the floor of the central pocket and substantially in the same horizontal plane with each other and forming friction surfaces, an inverted semi-elliptical spring having its end portions loosely fitted in the end pockets and pivotally and slidably engaging the friction floor surfaces thereof, and a plurality of nested coiled springs seated upon the floor of the central pocket beneath the central portion of the semi-elliptical spring and extending upwardly therefrom and engaging and yieldingly supporting the central portion of the semi-elliptical spring in balanced relation to the points of support of the ends of said spring on said friction surfaces.

10. In a spring supporting structure, the combination of a support comprising a central body portion having a pocket and outwardly extending arms each provided with a plurality of parallel pockets arranged above the level of the floor of the central pocket and equidistantly on opposite sides of the vertical plane thereof, a plurality of inverted semi-elliptical springs arranged side by side in parallel relation and having their end portions loosely mounted in the pockets in the arms and pivotally and slidably engaging the floors of said pockets, and a coiled spring means seated upon the floor of the pocket in the body portion of the support beneath the central portions of the semi-elliptical springs and extending upwardly therefrom for cooperation with said semi-elliptical springs to yieldingly support a load bearing object in balanced relation to the points of support of the ends of the semi-elliptical springs on the floors of the pocket.

11. In a spring supporting structure, the combination of a support having a central body portion and end portions, said body portion being provided with a plurality of pockets and the end portions each with a plurality of pockets arranged above the level of the floors of the first-named pockets and equidistantly on opposite sides of the longitudinal and transverse centers thereof, the floors of the latter-named pockets forming friction surfaces, a plurality of semi-elliptical springs arranged side by side in parallel relation and having their end portions loosely fitted in the pockets in the end portions of the support and pivotally and slidably engaging the friction floor surfaces thereof, and transversely alined coiled springs beneath the central portions of the semi-elliptical springs and engaging the pockets in the body portion of the support and extending upwardly therefrom for cooperation with the semi-elliptical springs to yieldingly support a load bearing object in balanced relation to the ends of the semi-elliptical springs engaging the friction surfaces.

12. In a spring supporting structure, the combination of a support having a central body portion provided with a plurality of pockets arranged in transverse alinement, and having end portions projecting outwardly and upwardly from the body portion and provided each with a plurality of pockets arranged in transverse alinement and provided with floor portions forming friction surfaces, a plurality of inverted semi-elliptical springs arranged side by side in parallel relation and having their end portions loosely fitted in the pockets in the arms and pivotally and slidably engaging the friction floor surfaces of the pockets in said end portions of the support, and a transversely alined series of coiled springs engaging the central pockets beneath the central portions of the semi-elliptical springs and extending upwardly therefrom for cooperation with the semi-elliptical springs to yieldingly support a load bearing object in balanced relation to the ends of the semi-elliptical springs engaging the friction surfaces.

13. In a spring supporting structure, a support having horizontally spaced spring seats each formed with a plane friction surface and terminating at its inner end in an elevated supporting portion, and an inverted semi-elliptical spring having its end portions arranged to slidably and pivotally engage said plane friction surfaces in predetermined contracted conditions of the spring under light loads and adapted when extended and compressed under heavier loads to be brought into engagement with said elevated supporting portions.

14. In a supporting spring structure, a support having spaced spring seats, each having a friction surface and a semi-elliptical load weight supporting spring spanning the space between said seats and having its end portions bearing on said friction surfaces of the seats and in pivotal and slidable engagement therewith in the extension and contraction of the spring within certain limits under predetermined light loads, said seats being provided at the inner ends of said friction surfaces with spring supporting portions raised above the level of the friction surfaces operating when the spring is compressed and extended under heavier loads to support the spring for pivotal and sliding movements and to reduce its effective length.

15. A spring structure comprising a backing member having a plurality of parallel pairs of end pockets provided with plane friction floor surfaces, and a plurality of intermediate pockets, a plurality of parallel semi-elliptic springs having floating end portions loosely fitted in the end pockets and pivotally and slidably engaging said friction floor surfaces of said end pockets, and a transverse series of coiled springs seated in the intermediate pockets beneath the central portions of the semi-elliptic springs and extending upwardly therefrom and engaging the central portions of the semi-elliptic springs to yieldingly support said springs at a point in balanced relationship to the points of engagement of the floating ends of said spring with said friction floor surfaces.

16. In a truck bolster spring, a truck side frame, a spring backing rigidly mounted thereon and having horizontally spaced friction surfaces, a semi-elliptic spring having free end portions slidably and pivotally engaging said friction surfaces of the backing, a coiled spring mounted on the backing beneath the central portion of the semi-elliptic spring and extending upwardly therefrom and engaging said central portion of said semi-elliptic spring and yieldingly supporting said semi-elliptic spring centrally in balanced relation to its points of support on the friction surfaces, and a bolster yieldingly supported by said springs, the semi-elliptic spring being arranged and acting to dampen the reactions of the coiled spring.

17. In a spring construction, the combination of a rigidly mounted backing member provided with spaced seats each having an outer bearing surface and a raised inner bearing surface, a semi-elliptic spring bridging between said seats and supported at its extreme outer ends on said outer bearing surfaces of the seats when carrying a light load and supported on the inner surfaces of the seats when carrying an increased load whereby under increased load the space between the bearing points of the spring is decreased.

JOHN J. TATUM.